US011080618B2

(12) United States Patent
Kam et al.

(10) Patent No.: US 11,080,618 B2
(45) Date of Patent: Aug. 3, 2021

(54) AUGMENTING INCOMPLETE TRAINING DATASETS FOR USE IN A MACHINE LEARNING SYSTEM

(71) Applicant: Upstart Network, Inc., San Carlos, CA (US)

(72) Inventors: Brandon Ray Kam, Los Altos, CA (US); Viraj Navkal, San Bruno, CA (US); Grant Schneider, Foster City, CA (US); Paul Gu, Redwood City, CA (US); Alec M. Zimmer, San Francisco, CA (US)

(73) Assignee: Upstart Network, Inc., San Carlos, CA (US)

( * ) Notice: Subject to any disclaimer, the term of this patent is extended or adjusted under 35 U.S.C. 154(b) by 876 days.

(21) Appl. No.: 15/806,161

(22) Filed: Nov. 7, 2017

(65) Prior Publication Data

US 2019/0138941 A1     May 9, 2019

(51) Int. Cl.
*G06N 20/00*     (2019.01)
*G06N 7/00*     (2006.01)

(52) U.S. Cl.
CPC .............. *G06N 20/00* (2019.01); *G06N 7/005* (2013.01)

(58) Field of Classification Search
CPC ............................... G06N 20/00; G06N 7/005
USPC ......................................................... 706/12
See application file for complete search history.

(56) References Cited

U.S. PATENT DOCUMENTS

2015/0026035 A1\* 1/2015 Showalter .............. G06Q 40/06
705/38
2018/0336484 A1\* 11/2018 Hunt ....................... G06F 17/18

OTHER PUBLICATIONS

Agnieszka Dardzinska, Zbigniew W. Ras, CHASE2—Rule Based Chase Algorithm for Information Systems of Type lambda. Active Mining 2003, 255-267 (Year: 2003).\*
Table of Data Fields for Interagency Loan Data Request, https://www.fdic.gov/news/news/financial/2013/FIL13012a.pdf (Year: 2013).\*

(Continued)

*Primary Examiner* — Daniel T Pellett
(74) *Attorney, Agent, or Firm* — Baker Botts L.L.P.

(57) ABSTRACT

Systems and methods for augmenting incomplete training dataset for use in a machine learning system are described herein. In an embodiment, a server computer receives a plurality of input training datasets including one or more incomplete input training datasets and one or more complete datasets which contain one or more failure training datasets, the incomplete input training datasets comprising a plurality of parameters. Using the one or more failure training datasets, the server computer generates temporal failure data describing a likelihood of failure of an item as a function of time. Using the one or more complete training datasets, the server computer generates parameter specific likelihoods of failure of an item. The server computer augments the one or more incomplete input training datasets using the temporal failure data and/or the parameter specific likelihoods of failure to create one or more augmented training datasets. The server computer uses the one or more augmented training datasets as input for training a machine learning model that is programmed to generate a probability of failure of a particular item represented by an input dataset.

24 Claims, 4 Drawing Sheets

(56) References Cited

OTHER PUBLICATIONS

L. Riggins, "Augmenting Your Training Data for Image Recognition," Towards Data Science, pub. in United States Nov. 17, 2020, downloaded Jan. 26, 2021, 7 pp.
B. Rowe, "What you need to know about data augmentation for machine learning," R-bloggers, pub. in United States Oct. 6, 2016, downloaded Jan. 26, 2021, 4 pp.
J. Hoffmann et al., "Machine learning in a data-limited regime: Augmenting experiments with synthetic data uncovers order in crumpled sheets," Sci. Adv. 5 (4) eaau6792, pub. in United States, Apr. 26, 2019, 9 pp.
U.S. Appl. No. 16/702,479, filed Dec. 3, 2019 (IFW).

* cited by examiner

AUGMENTING INCOMPLETE TRAINING DATASETS FOR USE IN A MACHINE LEARNING SYSTEM

FIELD OF THE INVENTION

The present disclosure generally relates to the technical field of computer-implemented machine learning algorithms. The disclosure relates more specifically to the technical field of augmenting incomplete datasets for use as training data in a machine learning algorithm.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Machine learning software tools allow computing devices to solve complex problems based on prior data. Generally, machine learning systems are trained using a large number of training datasets, each of which comprising a plurality of inputs and a verified output. For instance, classifiers can attempt to classify text based on prior text entries and prior classifications for those text entries.

Some machine learning systems are used to compute the probability of an event occurring within a particular period of time based on initial conditions. These machine learning systems may be utilized to compute the probability of a storm occurring in a given period of time, the probability of a machine failing during operation of a task, the probability of a person defaulting on a loan, or any number of possible event occurrences based on initial conditions.

Unfortunately, to properly train a machine learning system, a large number of datasets with definitive outcomes are needed. If a machine learning system is created to find the probability of a new piece of machinery failing within a five-year warranty period, the system would likely need a large number of machines that have been monitored for five years, together with outcome data for those machines during the period. Thus, in the initial few years of the machine's release, the system would have no way of accurately using a machine learning system to compute a probability of failure. Similarly, if a company is continuously issuing 3-year loans over a three-year period, where default occurs in a non-zero number of loans, it may be 3 years before a set of issued loans can be used as training data in a machine learning system designed to determine a probability of a loan defaulting.

The requirement for completed datasets in a machine learning system can seriously hamper the early effectiveness of these systems. Without complete datasets, a server cannot use a machine learning system to accurately predict events. Thus, servers without access to years of data may be unable to generate useful predictions, thereby negatively impacting the effectiveness of the server computer. Additionally, the data currently available to the server describing an item currently being monitored is useless in the machine learning context, regardless of the fact that the dataset includes useful information.

Furthermore, if a machine learning system could be effectively trained on incomplete as well as complete datasets, performance of said machine learning system could make more accurate predictions than one trained on only complete datasets.

Thus, there is a need for a system that augments incomplete datasets in order to leverage useful information in the incomplete datasets for the purpose of training a machine learning system.

SUMMARY

The appended claims may serve to summarize the disclosure.

DETAILED DESCRIPTION

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. SYSTEM OVERVIEW
3. COMPLETE, INCOMPLETE, AND FAILURE TRAINING DATASETS
4. PARAMETERS
5. TEMPORAL FAILURE DATA
6. PARAMETER SPECIFIC FAILURE DATA
7. MACHINE LEARNING MODEL
8. BENEFITS OF CERTAIN EMBODIMENTS
9. HARDWARE OVERVIEW

1. General Overview

Methods for augmenting incomplete training datasets are described. According to an embodiment, a server computer receives a plurality of training datasets including incomplete training datasets and complete training datasets indicating occurrence of an event, such as failure. Temporal data and/or parameter data is extracted from the training datasets indicating occurrence of the event. The extracted temporal data and/or parameter data is used in conjunction with temporal data and/or parameter data of the incomplete datasets to create temporal augmentations and/or parameter specific augmentations for the incomplete datasets. The incomplete datasets, with the temporal augmentations and/or parameter specific augmentations, are then used with complete datasets as training datasets in a machine learning system.

In an embodiment, a method comprises receiving a plurality of input training datasets including one or more incomplete input training datasets and one or more complete training datasets which comprise one or more failure training datasets, the one or more incomplete input training datasets comprising a plurality of parameters; augmenting the one or more incomplete input training datasets to create one or more augmented training datasets, wherein augmenting the one or more incomplete input datasets comprises: using the one or more failure training datasets, generating temporal failure data describing a likelihood of failure of an item as a function of time and using the temporal failure data to augment the incomplete input datasets; or using the one or more complete training datasets, generating parameter specific likelihoods of failure of an item and using the parameter specific likelihoods of failure to augment the incomplete input datasets; using the one or more augmented training datasets as input for training a machine learning model that is programmed to generate a probability of failure of a particular item represented by an input dataset.

2. System Overview

Figure 1:
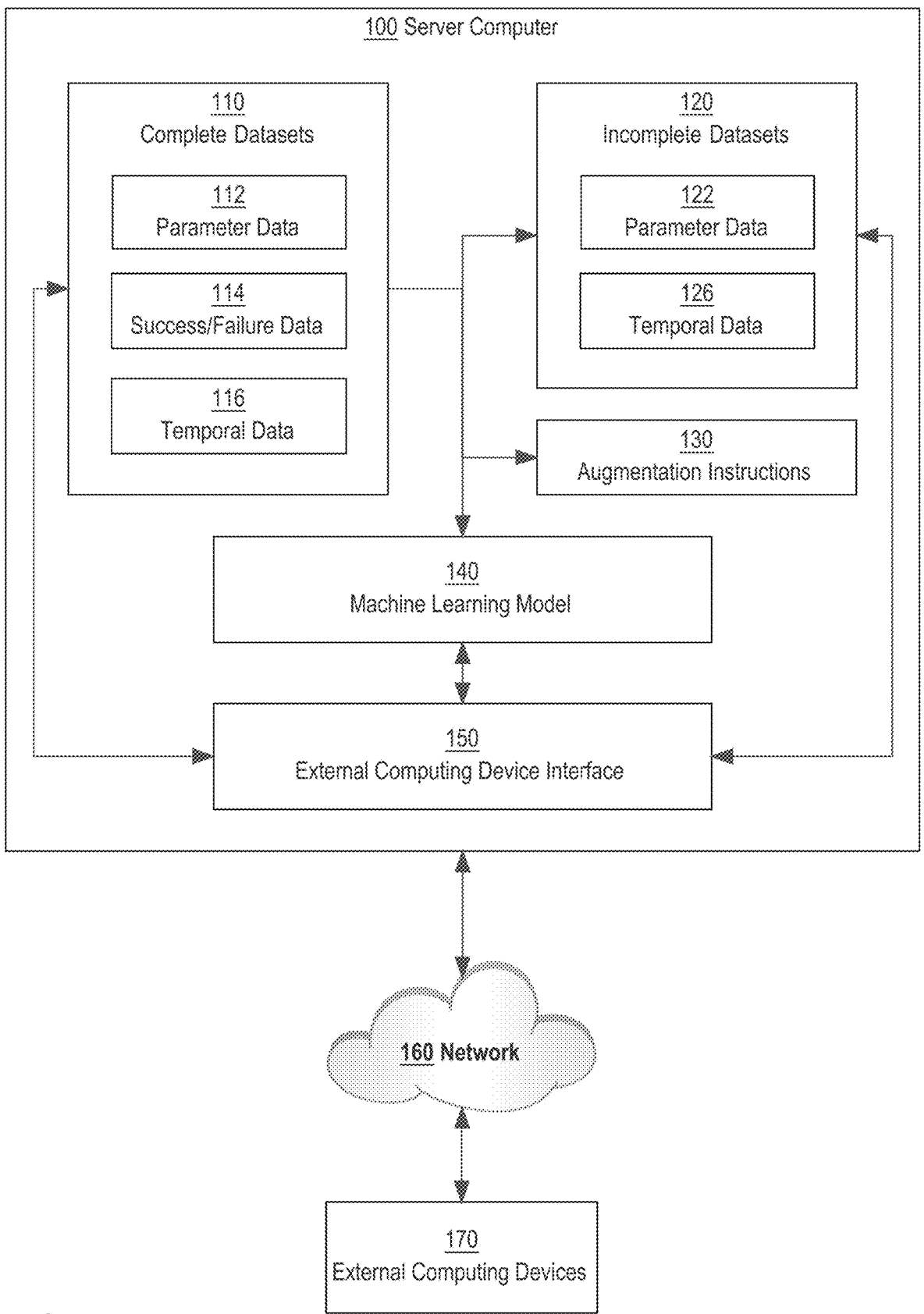
FIG. 1 depicts an example computer system in which the techniques described may be implemented according to an embodiment.

FIG. 1 depicts an example computer system in which the techniques described may be implemented according to an embodiment.

In the example of FIG. 1, a server computer 100 and an external computing device 170 are communicatively coupled to a data communications network 160. The network 100 broadly represents any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The server computer 100, external computing device 170, and other elements of the system may each comprise an interface compatible with the network 160 and are programmed or configured to use standardized protocols for communication across the networks such as TCP/IP, Bluetooth, and higher-layer protocols such as HTTP, TLS, and the like.

Server computer 100 may be implemented using a server-class computer or other computers having one or more processor cores, co-processors, or other computers. Server computer 100 may be a physical server computer and/or a virtual server instance stored in a data center, such as through cloud computing. The server computer 100 may be programmed or configured to generate and train a machine learning model. The server computer may comprise a plurality of communicatively coupled server computers including a server computer for training a machine learning model and a server computer for communicating with a client computing device. Server computer 100 stores complete datasets 110, incomplete datasets 120, augmentation instructions 130, machine learning model 140 and external computing device interface 150.

Complete datasets 110 comprise parameter data 112, success/failure data 114, and temporal data 116. Parameter data 112 includes data describing values for a plurality of parameters regarding a particular data item. Success/failure data 114 includes data describing whether the particular item was identified as a success and/or as a failure. Success and failure, as used herein, may refer to occurrence and/or non-occurrence of an event within a particular period of time and/or occurrence of different events. Temporal data 116 includes data describing an amount of time that has passed between initiation of the monitoring of an item and occurrence of an event for the time.

Generally, a complete dataset comprises a plurality of inputs and a definitive result for a particular item. For example, in the case of machinery monitoring during a particular operation, a completed dataset may include initial parameters describing the machinery and a value indicating whether the machinery was used successfully to complete the operation or whether the machinery broke down during the operation. As another example, in the case of loan monitoring, a completed dataset may include initial parameters describing the loan requestor and a value indicating whether the loan was paid or whether the requestor defaulted on the loan.

Incomplete datasets 120 comprise parameter data 122 and temporal data 126. Generally, incomplete datasets 120 comprise a plurality of inputs without corresponding outputs. Incomplete dataset may be stored describing items that are currently in progress and thus have neither ended in success nor failure. Thus, temporal data 126 may describe an amount of time that has passed between initiation of the monitoring of an item and a computation time. The computation time, as used herein, refers to an end time of the incomplete dataset prior to use of the dataset in the computation.

As an example, in the machinery context, the parameter data may include data describing the machinery and/or job while the temporal data describes an amount of time that has passed since the job was started. As the job has not been completed nor has the machinery failed, only incomplete success/failure data is available. In the loan example, the parameter data may describe the loan requestor and/or information regarding the loan while the temporal data describes an amount of time that has passed since the loan was granted. As the loan has neither been fully paid nor defaulted, only incomplete success/failure data is available.

Augmentation instructions 130 comprise a set of instructions, which, when executed by the server computer, cause the server computer to perform calculations that convert an incomplete dataset to an augmented dataset.

Machine learning model 140 comprises a set of instructions which, when executed by the server computer, cause the server computer to train a set of machine learning equations and/or use a set of machine learning equations to compute a probability of success or failure. An example of a machine learning model is logistic regression, and another example is a customized version of the XGBOOST software library that is modified to accept augmented datasets as input.

External computing device interface 150 comprises a set of instructions which, when executed by the server computer, causes the server computer to send data to and receive data from one or more external computing devices. External computing device interface 150 may include one or more application programming interfaces (APIs) and/or one or more graphical user interfaces (GUIs) which are used to communicate with external computing devices. For example, server computer 100 may communicate with external computers stored in one or more pieces of machinery which monitor the operation of the machinery. As another example, server computer 100 may communicate with one or more credit servers in order to obtain credit data on a loan requestor.

The instructions may be in machine executable code in the instruction set of a CPU and may have been compiled based upon source code written in JAVA, C, C++, OBJECTIVE-C, PYTHON, or any other human-readable programming language or environment, alone or in combination with scripts in JAVASCRIPT, other scripting languages and other programming source text. In another embodiment, the instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the server computer 100.

External computing device 170 is a computer that includes hardware capable of communicatively coupling external computing device 170 to one or more server computers, such as server computer 100 over one or more service providers. For example, client computing device 170 may include a network card that communicates with server computer 100 through a home or office wireless router (not illustrated in FIG. 1) coupled to an internet service provider. External computing device 170 may be a server-class computer, smart phone, personal computer, tablet computing device, PDAs, laptop, or any other computing device capable of transmitting and receiving information and performing the functions described herein.

FIG. 1 depicts server computer 100 and external computing device 170 as distinct elements for the purpose of illustrating a clear example. However, in other embodiments, more or fewer computers may accomplish the functions described herein. For example, a plurality of external computing devices may connect to the server computer 100. Additionally, server computer 100 may comprise a plurality of communicatively coupled server computers including a server computer for storing training datasets and a server computer for generating, training, and using a machine learning model.

3. Complete, Incomplete, and Failure Training Datasets

Figure 2:
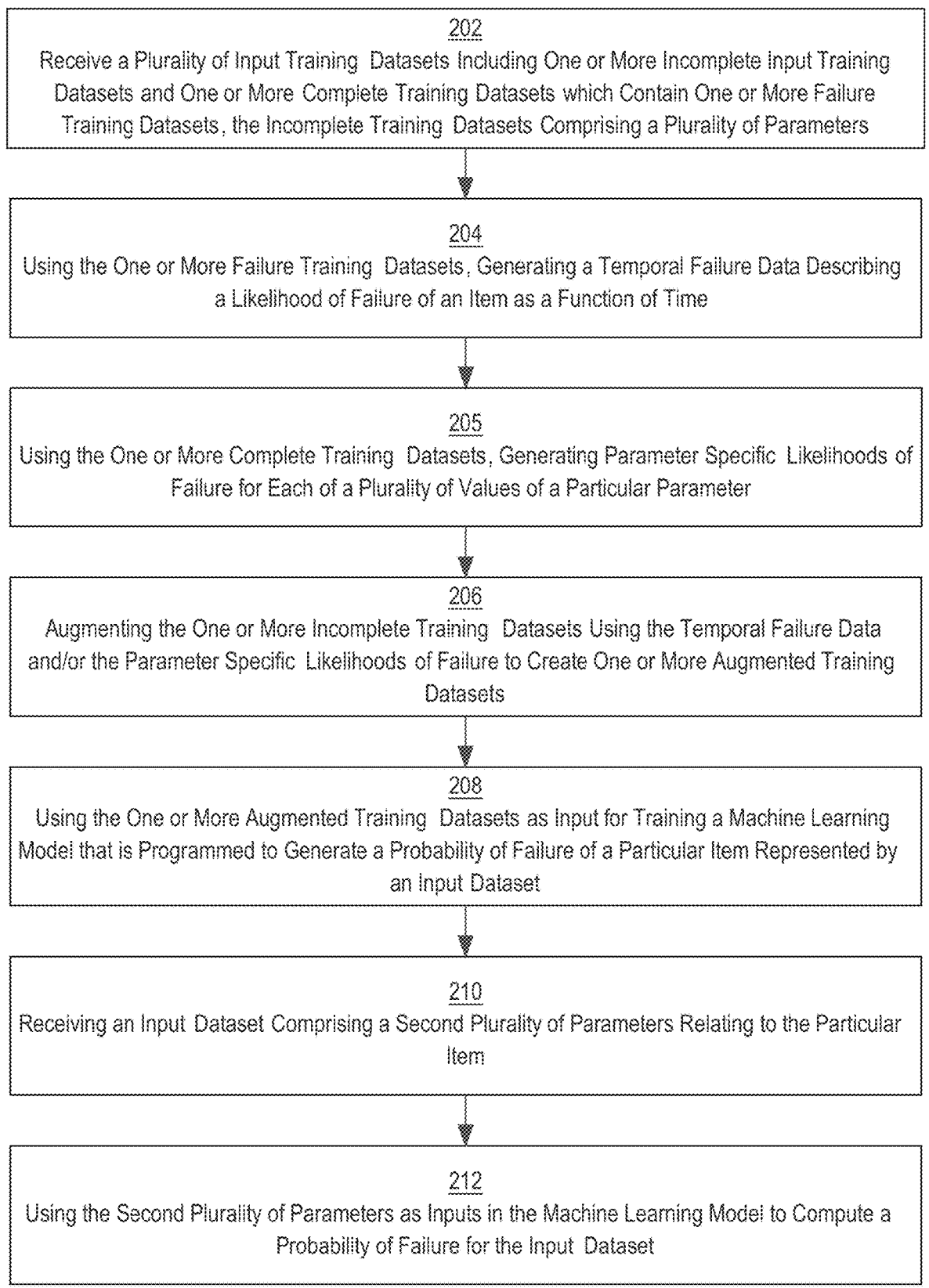
FIG. 2 depicts a method or algorithm for augmenting a machine learning system to compute probabilities of failure based, at least in part, on incomplete datasets.

FIG. 2 depicts a method or algorithm for augmenting a machine learning system to compute probabilities of failure based, at least in part, on incomplete datasets. FIG. 2, and each other flow diagram, algorithm illustration, or other algorithmic explanation in this document is intended to disclose a functional description of a process that may be used as a basis of writing computer programs to implement the functions that are described herein and which cause a computer to operate in the new manner that is disclosed herein. FIG. 2 and each other flow diagram is provided to communicate such an algorithm at the same level of detail that is normally used, by persons of skill in the art to which this disclosure is directed, to communicate among themselves about plans, designs, specifications and algorithms for other computer programs of a similar level of complexity at a functional level, recognizing that the accumulated education, knowledge and skill of such persons will be sufficient to transform the illustrations into working computer programs.

At step 202, a plurality of input training datasets including one or more incomplete input training datasets and one or more complete training datasets which contain one or more failure training datasets are received. The complete datasets include input data and success/failure data for a particular item. For example, a complete dataset for machinery monitoring may include initial parameters describing the machinery and a value indicating whether the machinery was used successfully to complete the operation or whether the machinery broke down during the operation. As another example, a completed dataset for loan monitoring may include initial parameters describing the loan requestor and a value indicating whether the loan was paid or whether the requestor defaulted on the loan.

Datasets may be based on items with temporal end conditions. For example, a three-year loan has a success condition if it is paid off in three years. As another example, a bitcoin mining operation has a success condition if a bitcoin is successfully mined after a particular period of time. In some cases, the success condition may occur prior to the temporal end condition. For example, while a three-year loan has a success condition if it is paid off in three years, prepayment of the three-year loan may occur prior to the three-year mark.

Datasets based on items with temporal end conditions may also be subject to early failure. For example, a failure condition may be defined as default of a three-year loan prior to payment in full. As another example, a failure condition may be defined as breakdown of a piece of machinery prior to a scheduled completion of a task.

While the present disclosure refers to success and failure, the use of the "failure" term is intended to refer to occurrence of a condition during pendency of an item. Thus, "failure" and "success" as used herein refer to occurrence of a first condition and occurrence of a second condition, respectively.

In some embodiments, the condition for "success" is termination of a period of time without the failure condition, such as in the loan and machinery examples described herein. In other embodiments, the condition for "failure" is termination of a period of time without the success condition occurring. For instance, an internet speed tracker may identify a failure if a particular file is not downloaded within a particular period of time and a success whenever the file is downloaded prior to the end of the particular period of time. In other embodiments, success and failure are conditions independent of the temporal aspect. For example, in the loan context a failure may be defined as the loan defaulting while a success is defined as the loan being paid in full.

While methods are described in terms of success and failure, the methods described herein may be employed any time there is more than one conditional outcome and a temporal aspect. Thus, an outcome does not need to be defined as either a failure or success as long as there are two or more distinguishable outcomes. For example, failure and success may refer to occurrence and non-occurrence of an event respectively during a period of time. In the machinery example, outcomes could be operational, mechanical failure, or software failure.

An incomplete dataset refers to a dataset where an outcome has not been determined. For example, a currently open loan account may not be identified as either defaulted or paid. Thus, the dataset would be incomplete as no final outcome has been determined. Where an item takes a long time to complete, such as on the order of years, a system may have access to a large number of incomplete datasets. A server computer may use the methods described herein to augment the incomplete dataset for use in a machine learning system.

4. Parameters

Training datasets, as described herein comprise a plurality of inputs. The inputs are parameters that define initial conditions as well as changes in conditions prior to a completed output. Parameters may differ depending on the type of dataset. For example, parameters for a machinery dataset may include data describing the manufacturer of the machinery, the number of years the machinery has been in use, a difficulty of the task, etc. For complete datasets, the parameters may additionally include a temporal value indicating a period of time from initial loan transaction to completion. For example, in the machinery context, a value may indicate how long the machinery was operable before it ceased to function.

Some datasets may differ from others on what parameters are included. For example, incomplete datasets would lack a temporal parameter indicating a time of success or failure, but may include a temporal parameter indicating a period of time between inception and a computation time. Thus, an incomplete dataset may indicate that it has been five hours and forty-nine minutes since inception of a task that has neither been completed nor failed. Additionally, some datasets may include a status value indicating a status of the item. For example, a parameter may identify obstacles to a machine completing its job, such as reported errors.

Datasets may be stored as a plurality of rows in a columnar datastore wherein each row represents a different dataset and each column represents a parameter. Additionally and/or alternatively, the datasets may be stored as vectors of values wherein each value refers to a different parameter. Regardless of how the datasets are stored, the server computer is able to distinguish between different parameters of the dataset.

The practical example of a three-year loan is described herein. Parameter data for a three-year loan may include credit data, borrower data, loan data, temporal data, and loan status data. Credit data may include data derived from a credit report prior to a loan transaction, such as a FICO credit score, a revolving balance over a previous year, a number of prior bankruptcies, a number of prior defaults, a number of times a prior loan was 30/60/90 days late, and/or other data extracted from a credit report. Borrower data may include data regarding a borrowing entity, such as education level, income, and job type. Loan data may include data about the loan itself, such as the terms of the loan, an interest rate, and how the loan was obtained. Temporal data may include data defining a time period from the loan transaction to either success, failure, or a computation time of the loan. Loan status data may include data regarding a current status of the loan, such as whether the loan is current, 30/60/90 days late, modified, paid, or defaulted.

Portions of the training datasets may be obtained from an outside source, such as a loan provider, and/or monitored and updated over time. For example, a loan provider computing device may store initial conditions of a loan as well as track the loan over time. Thus, as changes are made to the loan, the loan provider computing device may update the training dataset. When a computation is to be performed, the loan provider computing device may send the datasets, including complete and incomplete datasets, to the server computer. Additionally and/or alternatively, the same computing device may store the datasets and perform the computations described herein using the datasets.

5. Temporal Failure Data

At step 204, temporal failure data describing a likelihood of failure of an item as a function of time is generated using the one or more failure training datasets. The server computer may identify the failure training datasets of the plurality of datasets as the datasets that indicate that a condition occurred. For example, the server computer may identify loan datasets that include data indicating that the loan defaulted. As another example, the server computer may identify machinery datasets that include data indicating that the machinery failed during performance of a task.

Using the failure datasets, the server computer generates temporal failure data describing a likelihood of failure or success of an item as a function of time. The server computer may extract from the failure datasets, temporal data indicating when the condition occurred for the item. For instance, defaulted loan datasets may indicate when, within the loan period, the loan defaulted. As a practical example, a first loan dataset may indicate that the loan defaulted after 475 days while a second loan dataset may indicate that the loan defaulted after 542 days. Using the temporal data from a plurality of failure datasets, the server computer may generate a cumulative distribution that describes likelihood of failure over time and/or a cumulative distribution that describes the likelihood of success over time. The cumulative distribution function provides data describing when a failure or success is most likely to occur if a failure or success occurs. As "failure" and "success" describe occurrence of two different conditions generally, the creation of the temporal failure curve may be a cumulative distribution describing the likelihood of a first condition based on data indicating occurrence of the first condition, data indicating occurrence of a second condition, or both data indicating occurrence of the first condition and data indicating occurrence of the second condition.

In an embodiment, success datasets are also used to generate the cumulative distribution. For example, a cumulative distribution based on only the failure datasets may indicate a distribution of where failure occurs when failure occurs. In contrast, a cumulative distribution based on both failure and success datasets may indicate a probability that failure will occur by a given point in time. For example, if ten datasets indicate failure prior to a time A, twenty datasets indicate failure after time A, and twenty datasets indicate success, the probability for failure prior to time A would be 20%.

In an embodiment, incomplete datasets are also used to generate the cumulative distribution. For example, incomplete datasets may be used in addition to the complete datasets to compute a probability of failure prior to a computation time of the incomplete datasets. For example if ten datasets indicate failure prior to a time A, twenty datasets indicate failure after time A, ten datasets indicate success, and ten datasets are incomplete but include a computation time after time A, then probability for failure prior to time A would be 20%.

In an embodiment, the cumulative distribution describes the probability of success over time. For example, if the probability of failure prior to time A is 20%, then the probability of success prior to time A may be 80%. Thus, while failure data is used to create the cumulative distribution, the cumulative distribution may describe the probability of success over time instead of a probability of failure. Additionally or alternatively, the probability of success may be independent of the probability of failure in embodiments. For example, where failure is defined as occurrence of a first event and success is defined as occurrence of a second event, non-occurrence of either event and/or occurrence of a third event may be contemplated, such that the probability of failure and the probability of success do not sum to 100%. The server computer may still use failure data to compute a success curve, such as by including data which does not indicate occurrence of the failure condition or success condition.

6. Parameter Specific Failure Data

At step 205, parameter specific likelihoods of failure for each of a plurality of values of a particular parameter are generated using the one or more complete training datasets. For example, the server computer may include one or more values that describe the likelihood of failure of an item as a function of a parameter at the computation time. The parameter may be preselected as a parameter that changes over the course of the item. In the machinery example, the parameter may include an identifier of a subtask of a plurality of subtasks. In the loan example, the parameter may include a status of the loan, such as current, 30 days late, 60 days late, 90 days late, and modified.

The value describing the likelihood of failure of the item as a function of the parameter may be empirically chosen and/or computed. For example, the server computer may store parameter specific likelihoods of failure which indicate empirically determined likelihoods of failure based on status. Additionally and/or alternatively, the server computer may use the complete datasets to compute likelihoods of failure as a function of status. As an example, if a particular machine produces error codes A-E, the server computer may determine a percentage of failures that occurred after error code E was produced and store that value with an identifier of error code E. As an example in the loan context, a server computer may use the success/failure data to determine a percentage of loans that defaulted after being 60 days late.

As with the temporal failure data, parameter specific likelihoods of success may be used instead of parameter specific likelihoods of failure. Thus, instead of storing data describing the likelihood that a process will fail based on a specific parameter occurrence, the server computer may store data describing the likelihood that a process will succeed based on a specific parameter occurrence.

Based on parameters in the incomplete training datasets, the server computer adds a parameter specific likelihood of failure to the incomplete training dataset. For example, the server computer may initially determine a value for the parameter in the incomplete dataset. The server computer may then access a data record which identifies parameter specific likelihoods of failure for different values of the parameter. The server computer may select, from the data record, a parameter specific likelihood of failure that is associated with the value for the parameter in the incomplete dataset. The server computer may then include the parameter specific likelihood of failure in the augmented training dataset.

At step 206, the one or more incomplete input training datasets are augmented using the temporal failure data and/or the parameter specific likelihoods of failure to create one or more augmented training datasets. For example, given an incomplete dataset with loan status data and temporal data describing a period of time between the loan transaction and a computation time, the server computer may use the cumulative distribution function and the parameter specific likelihoods of failure based on loan status to compute a relative probability that the loan will default after the computation time. This value may be included in the incomplete input training dataset to create an augmented training dataset. Computations in a machine learning model using this information are described further herein in reference to step 208.

7. Machine Learning Model

At step 208, the one or more augmented training datasets are used as input for training a machine learning model that is programmed to generate a probability of success or failure of a particular item represented by an input dataset. The presence of the temporal failure curve 302 renders standard usage of machine learning models ineffective, so various machine learning models may accept as inputs the augmented training datasets with some modifications. For example, the server computer may use logistic regression and/or a gradient boosted decision tree framework, such as a customized version of XGBOOST, to perform an optimization on the augmented training dataset.

Figure 3:
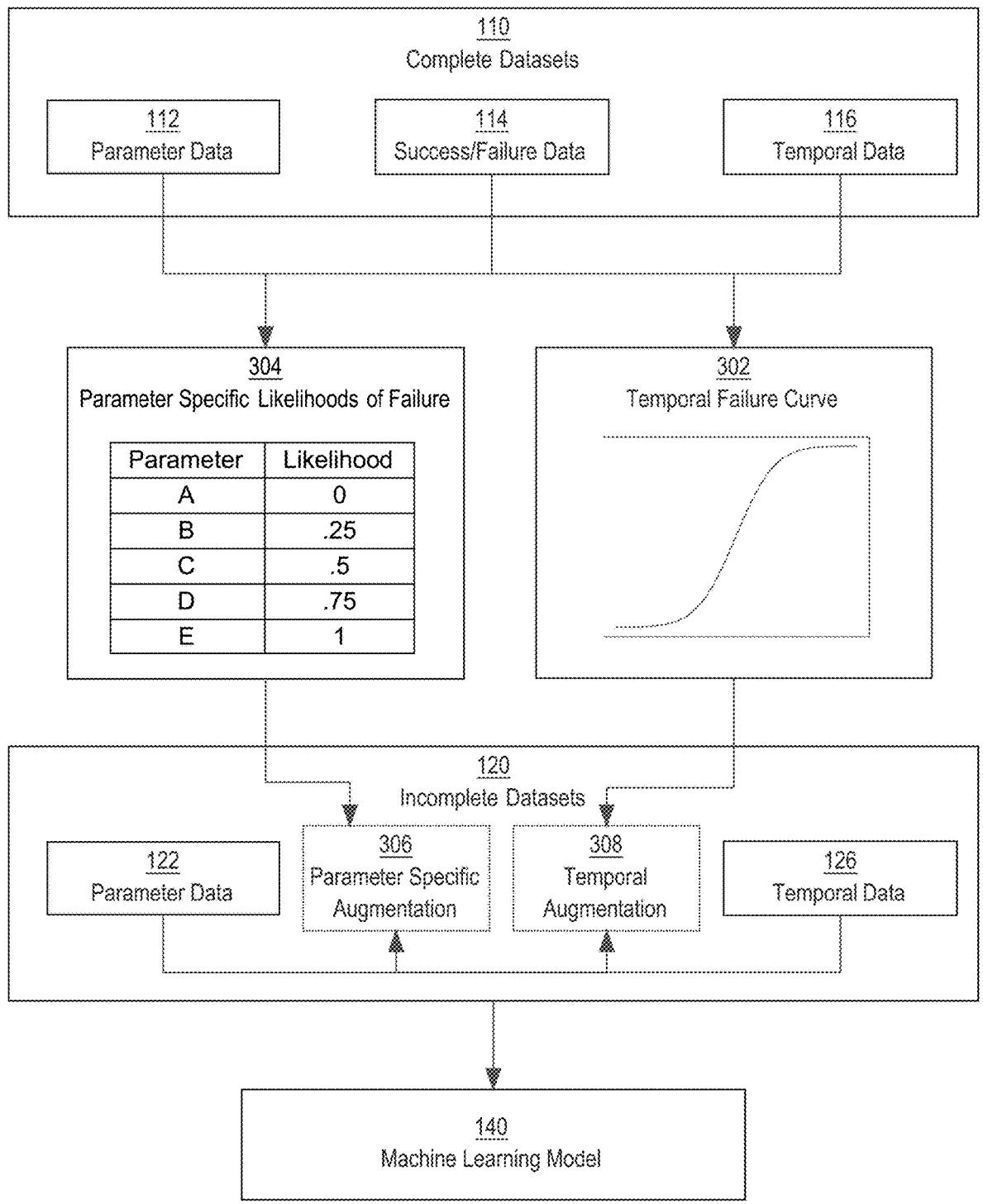
FIG. 3 depicts a method or algorithm of augmenting incomplete training datasets with data derived from complete datasets.

FIG. 3 depicts a method of augmenting incomplete training datasets with data derived from complete datasets. Complete datasets 110 include parameter data 112, success/failure data 114, and temporal data 116. Parameter data 112 includes initial parameters and parameters that change over time, such as a status value. Success/failure data 114 includes data identifying one of at least two outcomes for an item. Temporal data 116 identifies a period of time that elapsed for the item prior to the one of at least two outcomes for the item.

The success/failure data 114 is combined with parameter data 112 and/or temporal data 116 to generate parameter specific likelihoods of failure 304. Parameter specific likelihoods of failure 304 indicate a probability of a dataset ending in failure based on a particular value for a particular parameter. For example, if 34% of the datasets with parameter value A occurring during the pendency of the item end in failure while 66% of the datasets with parameter value A occurring during the pendency of the item ended in success, then the parameter specific likelihood of failure may be identified as 0.34. In other embodiments, the values may be empirically selected. For example, in FIG. 3, the likelihood for value A of the parameter is selected as 0 with likelihood values raising by 0.25 as the value increases from A to E.

In an embodiment, the parameter specific likelihoods of failure 304 additionally include a temporal component. For example, the server computer may compute probabilities of failure based on particular parameters occurring at different points in time. Thus, the occurrence of parameter B at a first time may be associated with a 25% probability of failure while the occurrence of parameter B at a second time may be associated with a 33% probability of failure. The server computer may store the different probabilities of failure as discrete values, as shown in 304 and/or as a failure curve describing the different probabilities of failure based on a parameter at a particular time.

In an embodiment, there could be more than one parameter that has parameter specific likelihoods of failure 304. For example, the server computer may compute probabilities of failure for two different parameters, X and Y, that each have their own likelihoods of failure. Parameter X could have value 0.25 which indicates a 25% probability of failure, while parameter Y could have value 0.10 which indicates a 10% probability of failure. In an embodiment, one of the parameters could be selected as the parameter specific likelihood of failure. In another embodiment, a mathematical function using both parameters could be used to generate another parameter, whose values are then used as the parameter specific likelihoods of failure to augment the incomplete datasets.

The success/failure data 114 is combined with temporal data 116 and/or parameter data 112 to generate temporal failure curve 302. In the embodiment of FIG. 3, the temporal failure curve is a cumulative distribution which rises in likelihood of failure as time progresses, based on the data in at least the failure training datasets. The temporal failure curve 302 may be stored as data describing the values used to generate the temporal failure curve 302, such as the equation for building a cumulative distribution function based on a series of temporal values associated with occurrence of a failure. In other embodiments, the success/failure data is combined with temporal data 116/and or parameter data 112 to generate a temporal success curve which describes the likelihood of success of an item over time.

The parameter specific likelihoods of failure 304 and temporal failure curve 302 are used to augment the incomplete datasets 120. For each incomplete dataset, the parameter data 122, the parameter specific likelihoods of failure 304 and/or temporal data 126 are used to generate a parameter specific augmentation 306. The temporal data 126, the temporal failure curve 302 and/or parameter data 122 are used to generate temporal augmentation 308. In an embodiment, the temporal augmentation may include parameter data and/or the parameter specific augmentation may use the temporal data. The temporal augmentation may include a value extracted from the temporal failure curve, such as the combined probabilities of failure occurring after the computation time from the temporal data 126. The augmented incomplete dataset, now augmented with parameter specific augmentation 306 and temporal augmentation 308, can be used as an input training dataset into a machine learning model 140 designed to handle this augmented data.

While FIG. 3 depicts the temporal failure curve being generated from complete datasets, in other embodiments, the temporal failure curve is generated from both complete and incomplete datasets. Thus, datasets which indicate whether a failure occurred within a first period of time may be used to compute a probability of failure during that period of time even if some of those datasets cannot be used to compute a probability of failure during a future period of time.

Augmenting the incomplete datasets may include generating an augmented variable to be fed into a machine learning system, such as a customized version of the XGBOOST gradient boosted decision tree framework. As an example, a variable that may be used as an input into the machine learning system may comprise:

$$d_i = \left(q_i + (1-q_i)\frac{h_\beta(x_i)F(t_i)}{h_\beta(x_i)F(t_i)-1}\right)(1-h_\beta(x_i))$$

where $d_i$ is a variable that is the gradient calculation for the i-th training dataset. In the above equation, $q_i$ is the parameter specific likelihood of failure for the i-th training dataset based on the value of the parameter in the i-th training dataset. In a basic example for loan tracking, $q_i$ may be 0 if the loan is current, and values greater than 0 if the loan is late, about to default, and/or in a grace period prior to being late.

In the above equation, F(t) is the temporal failure data. For instance, F(t) may be a cumulative distribution function describing the probability of failure as a function of time. Thus, $F(t_i)$ may comprise a value extracted from the cumulative distribution function at the computation time for the i-th training dataset.

In the above equation, $h_\beta(x_i)$ is a function of β, a plurality of coefficients, and $x_i$, a plurality of parameters. The function of β and x is selected to identify the best set of coefficients β such that the error between the actual probability of failure and the modeled probability of failure is minimized by some pre-defined metric. In an embodiment, the function $h_\beta(x_i)$ may be of the logistic form, and we may want to obtain the maximum likelihood estimate for coefficients β by using gradient descent or some other optimization algorithm. For example, logistic regression may be used to identify the maximum likelihood estimate for coefficients β that best fits the data based on initial parameters, time, and/or parameter-specific attributes such as status. Gradient descent or another optimization algorithm may then be used to calculate the maximum likelihood estimate.

The server computer may be additionally or alternatively configured to optimize β by calculating the Hessian. This could be a second variable defined by:

$$g_i = \left[1 + (1-q_i)\frac{F(t_i)-1}{(F(t_i)h_\beta(x_i)-1)^2}\right]h_\beta(x_i)(h_\beta(x_i)-1)$$

where $g_i$ is a variable that is the Hessian calculation for the i-th training dataset. The above described variables are examples of variables that have been augmented to include temporal failure data, F(t), and parameter specific failure data, $q_i$, so that the incomplete datasets may be incorporated into a machine learning algorithm to optimize the coefficients for the various parameters.

The above described variables are merely examples of incorporating temporal failure data and parameter specific failure data into an incomplete dataset. In some embodiments, only temporal failure data is incorporated into the incomplete datasets. In other embodiments, only parameter specific failure data is incorporated into the incomplete datasets. Additionally, different forms of the above equations may be utilized.

The above calculations are one example of how to derive gradient and Hessian variables for use in any gradient descent based machine learning algorithms. In one embodiment, a customized logistic regression algorithm may be implemented using the calculated gradient and Hessian variables. In another embodiment, modifications of the XGBOOST machine learning algorithm may be used. XGBOOST allows users to specify a customized objective function that involves the gradient and Hessian calculation. However, XGBOOST does not allow for the specification of temporal failure data F(t), so a customized version may be implemented that allows for F(t) to be included. This involves modifying the source code for XGBOOST such that a user-defined objective function may provide F(t) as a third input (XGBOOST only allows two inputs for user-defined objective functions). The server computer may train the machine learning algorithm using a combination of completed datasets and augmented incomplete datasets. The machine learning algorithm may then be used to compute likelihoods of failure for new datasets. By using temporal failure data and parameter specific failure data to augment the incomplete datasets, a server computer is able to generate a robust machine learning tool that would have been otherwise unavailable due to sparseness in the number of completed datasets. A server computer is also able to generate better machine learning predictions by using a combination of completed datasets and augmented incomplete datasets, compared to a server computer limited to using only completed datasets.

Referring back to FIG. 2, at step 210, an input dataset comprising a second plurality of parameters is received. The input dataset may include different parameters than in the training datasets. For example, the loan training datasets may include a status of the loan which is used to create the parameter specific likelihood of failure while an input dataset for a new loan would not include a loan status parameter. Additionally, some parameter data may be unavailable in either the input dataset or one or more of the training datasets.

At step 212, the second plurality of parameters is used as inputs in the machine learning model to compute a probability of failure for the input dataset. For example, using one of the above equations optimized through the machine learning model, the server computer may compute a probability of failure based on the input dataset as a function of $h_\beta(y)$ where y is the parameters for the input dataset. Additionally or alternatively, the server computer may compute a probability of success based on the input dataset. For example, the server computer may generate the augmented datasets using a cumulative distribution of likelihood of success over time and parameter likelihoods of success and use the augmented training datasets to train a machine learning model for computing a likelihood of success of the item.

Based on the computed probability of success or failure, the server computer is able to perform particular actions. In the machinery context, the server computer may select machinery to use which has a low probability of failure instead of machinery which has a high probability of failure. In the loan context, the server computer may determine whether to issue a loan based on probability of default. The server computer may also determine that items with high probability of failure are to be monitored more carefully than items with low probabilities of failure. Additionally, aspects of the item may be determined based on probability of failure. For instance, an amount of time a machine operates in a single sitting may be selected based on the machine's probability of failure. As another example, values for a loan, such as the interest of the loan or collateral may be based on the probability of default for the loan.

8. Benefits of Certain Embodiments

The methods described herein provide a computing device with a method of augmenting datasets to allow previously unusable datasets to be used as training input for a machine learning system. By augmenting incomplete datasets, a server computer increases its ability to produce accurate machine learning models in early stages of tracking. Thus, the computer device may produce these models faster as the data is available for use to the server computer sooner. Additionally, the methods described herein may be used to reduce the storage requirements for a machine learning model as the machine learning model may be trained on a smaller number of datasets. Furthermore, the methods described herein allows the computer device to produce better machine learning models than previously possible, because the computer device will be allowed to train on data from incomplete as well as complete datasets.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
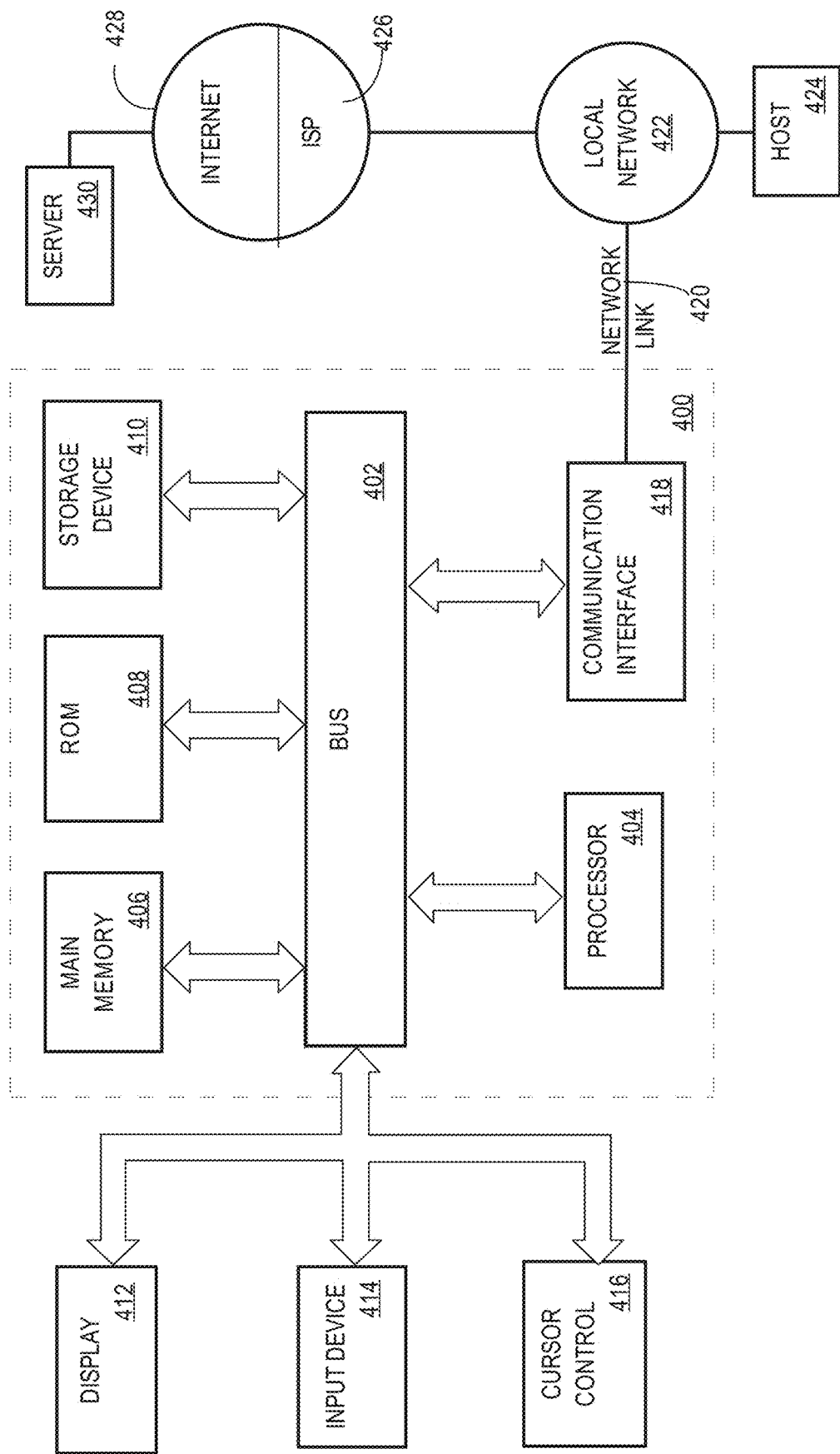
FIG. 4 depicts a block diagram that illustrates a computer system upon which an embodiment may be implemented.

For example, FIG. 4 is a block diagram that illustrates a computer system 400 upon which an embodiment may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A data processing system comprising:
   one or more processors;
   a memory coupled to the one or more processors and storing instructions which, when executed by the one or more processors, cause performance of:
   receiving a plurality of input training datasets including one or more incomplete input training datasets and one or more complete training datasets which comprise one or more success training datasets and one or more failure training datasets, the one or more complete training datasets and the one or more incomplete input training datasets comprising a plurality of parameters;
   augmenting the one or more incomplete input training datasets to create one or more augmented training datasets, wherein augmenting the one or more incomplete input training datasets comprises:
      generating, using the one or more success training datasets and failure training datasets, a temporal failure curve that describes a likelihood of success or failure of an item as a function of time;
      generating temporal failure data by extracting, from the temporal failure curve, a value describing the likelihood of failure of the item at a particular time; and
      using the temporal failure data to augment the incomplete input training datasets;
   training a machine learning model using the one or more augmented training datasets as an input; and
   generating, using the trained machine learning model, a probability of success or failure of a particular item represented by an input dataset.

2. The system of claim 1, wherein generating the temporal failure data curve that describes a likelihood of success or failure of an item as a function of time comprises:
   identifying, in each of the failure training datasets, temporal data indicating when a failure occurred for the item; and
   using the temporal data, generating a cumulative distribution function that describes the likelihood of success or failure of the item over time.

3. The system of claim 1, wherein the instructions, when executed by the one or more processors, further cause performance of:
   receiving the input dataset comprising a second plurality of parameters relating to the particular item;
   using the second plurality of parameters as inputs in the machine learning model to compute the probability of success or failure for the input dataset.

4. The system of claim 1, wherein the machine learning model comprises a set of program instructions that implement a logistic regression and/or a gradient boosted decision tree.

5. The system of claim 1, wherein augmenting the one or more incomplete input training datasets further comprises generating parameter specific likelihoods of success or failure of an item and using the parameter specific likelihoods of success or failure to augment the incomplete input datasets.

6. The system of claim 5 wherein the generated parameter specific likelihoods of success or failure of an item are computed for each of a plurality of values of a particular parameter, wherein the particular parameter relates to a status of the incomplete training dataset at a computation time.

7. The system of claim 1, wherein the one or more incomplete training datasets comprise data regarding loan transactions that have neither been fully paid nor defaulted upon.

8. The system of claim 7, wherein the plurality of parameters includes a current status of an associated loan transaction, a number of days since closing the associated loan transaction, and one or more parameters related to a recipient of the associated loan transaction.

9. A method comprising, by a computing system:
receiving a plurality of input training datasets including one or more incomplete input training datasets and one or more complete training datasets which comprise one or more success training datasets and one or more failure training datasets, the one or more complete training datasets and the one or more incomplete input training datasets comprising a plurality of parameters;
augmenting the one or more incomplete input training datasets to create one or more augmented training datasets, wherein augmenting the one or more incomplete input training datasets comprises:
generating, using the one or more success training datasets and failure training datasets, a temporal failure curve that describes a likelihood of success or failure of an item as a function of time;
generating temporal failure data by extracting, from the temporal failure curve, a value describing the likelihood of failure of the item at a particular time; and
using the temporal failure data to augment the incomplete input training datasets;
training a machine learning model using the one or more augmented training datasets as an input; and
generating, using the trained machine learning model, a probability of success or failure of a particular item represented by an input dataset.

10. The method of claim 9, wherein generating the temporal failure data curve that describes a likelihood of success or failure of an item as a function of time comprises:
identifying, in each of the failure training datasets, temporal data indicating when a failure occurred for the item; and
using the temporal data, generating a cumulative distribution function that describes the likelihood of success or failure of the item over time.

11. The method of claim 9, further comprising:
receiving the input dataset comprising a second plurality of parameters relating to the particular item;
using the second plurality of parameters as inputs in the machine learning model to compute the probability of success or failure for the input dataset.

12. The method of claim 9, wherein the machine learning model comprises a set of program instructions that implement a logistic regression and/or a gradient boosted decision tree.

13. The method of claim 9, wherein augmenting the one or more incomplete input training datasets further comprises generating parameter specific likelihoods of success or failure of an item and using the parameter specific likelihoods of success or failure to augment the incomplete input datasets.

14. The method of claim 13 wherein the generated parameter specific likelihoods of success or failure of an item are computed for each of a plurality of values of a particular parameter, wherein the particular parameter relates to a status of the incomplete training dataset at a computation time.

15. The method of claim 9, wherein incomplete training datasets comprise data regarding loan transactions that have neither been fully paid nor defaulted upon.

16. The method of claim 15, wherein the plurality of parameters includes a current status of an associated loan transaction, a number of days since closing the associated loan transaction, and one or more parameters related to the recipient of the associated loan transaction.

17. One or more non-transitory computer-readable media storing instructions which, when executed by one or more processors, cause:
receiving a plurality of input training datasets including one or more incomplete input training datasets and one or more complete training datasets which comprise one or more success training datasets and one or more failure training datasets, the one or more complete training datasets and the one or more incomplete input training datasets comprising a plurality of parameters;
augmenting the one or more incomplete input training datasets to create one or more augmented training datasets, wherein augmenting the one or more incomplete input training datasets comprises:
generating, using the one or more success training datasets and failure training datasets, a temporal failure curve that describes a likelihood of success or failure of an item as a function of time;
generating temporal failure data by extracting, from the temporal failure curve, a value describing the likelihood of failure of the item at a particular time; and
using the temporal failure data to augment the incomplete input training datasets;
training a machine learning model using the one or more augmented training datasets as an input; and
generating, using the trained machine learning model, a probability of success or failure of a particular item represented by an input dataset.

18. The one or more non-transitory computer-readable media of claim 17, wherein generating the temporal failure data curve that describes a likelihood of success or failure of an item as a function of time comprises:
identifying, in each of the failure training datasets, temporal data indicating when a failure occurred for the item; and
using the temporal data, generating a cumulative distribution function that describes the likelihood of success or failure of the item over time.

19. The one or more non-transitory computer-readable media of claim 17, wherein the instructions, when executed by the one or more processors, further cause performance of:
receiving the input dataset comprising a second plurality of parameters relating to the particular item;
using the second plurality of parameters as inputs in the machine learning model to compute the probability of success or failure for the input dataset.

20. The one or more non-transitory computer-readable media of claim 17, wherein the machine learning model comprises a set of program instructions that implement a logistic regression and a gradient boosted decision tree.

21. The one or more non-transitory computer-readable media of claim 17, wherein the instructions, when executed by the one or more processors, further cause performance of:
generating parameter specific likelihoods of success or failure of an item and using the parameter specific likelihoods of success or failure to augment the incomplete input datasets.

22. The one or more non-transitory computer-readable media of claim 21 wherein the generated parameter specific likelihoods of success or failure of an item are computed for each of a plurality of values of a particular parameter, wherein the particular parameter relates to a status of the incomplete training dataset at a computation time.

23. The one or more non-transitory computer-readable media of claim 17, wherein incomplete training datasets comprise data regarding loan transactions that have neither been fully paid nor defaulted upon.

24. The one or more non-transitory computer-readable media of claim 23, wherein the plurality of parameters includes a current status of an associated loan transaction, a number of days since closing the associated loan transaction, and one or more parameters related to the recipient of the associated loan transaction.

* * * * *